United States Patent [19]
Laird et al.

[11] Patent Number: 5,799,039
[45] Date of Patent: Aug. 25, 1998

[54] METHOD AND APPARATUS FOR ERROR MITIGATING A RECEIVED COMMUNICATION SIGNAL

[75] Inventors: Kevin Michael Laird, Haltom City, Tex.; Sybren D. Smith, Indialantic, Fla.; Paul D. Marko, Pembroke Pines, Fla.; Craig P. Wadin, Sunrise, Fla.

[73] Assignee: Motorola, Inc., Schaumburg, Ill.

[21] Appl. No.: 450,454

[22] Filed: May 25, 1995

Related U.S. Application Data

[63] Continuation-in-part of Ser. No. 308,185, Sep. 19, 1994, Pat. No. 5,687,189.

[51] Int. Cl.$^6$ ............................................. H04B 14/06
[52] U.S. Cl. ............................. 375/244; 371/35; 371/37.7
[58] Field of Search .............................. 375/244; 371/35, 371/37.7, 37.1

[56] References Cited

U.S. PATENT DOCUMENTS

| | | | |
|---|---|---|---|
| 4,513,426 | 4/1985 | Jayant | 375/26 |
| 4,907,248 | 3/1990 | Bretl | 375/27 |
| 5,247,544 | 9/1993 | LaRosa et al. | 375/118 |
| 5,408,499 | 4/1995 | Sasaki | 375/286 |
| 5,511,095 | 4/1996 | Inoue et al. | 375/244 |
| 5,526,398 | 6/1996 | Okada et al. | 379/57 |

OTHER PUBLICATIONS

Matsumoto, et al., "Enhancement of Speech Coding for Digital Cordless Telephone Systems", Fourth Int'l Symposium on Personal Indoor and Mobile Radio Coms (PIMRC), Sep. 11, 1993, pp. 618–621.

Kubota, et al., "Improved ADPCM Voice Transmission Employing Click Noise Detection Scheme for TDMA-TDD Systems", Fourth Int'l Symposium on Personal Indoor and Mobile Radio Coms (PIMRC), Sep. 11, 1993, pp. 613–617.

Nakamura, et al., "Improved ADPCM Voice Transmission for TDMA-TDD Systems", Proceedings of the 43rd Vehicular Technology Conference, 1993, pp. 301–304.

"General Aspects of Digital Transmission Systems; Terminal Equipments," Int'l Telecom Union CCITT, vol. III.4, IXth Plenary Assembly, Melbourne, 14–25 Nov. 1988.

*Primary Examiner*—Stephen Chin
*Assistant Examiner*—Mohammad Ghayour
*Attorney, Agent, or Firm*—Bruce Terry

[57] ABSTRACT

A method and apparatus for mitigating error in a received communications signal includes an error mitigator (35) of a communication unit (12) which receives and performs mitigation based on an error indication. In a first embodiment the error indication is a phase or non-used data symbol indicating error in ADPCM data, and mitigation includes changing certain nibble values to different predetermined values. In a second embodiment the error indication may include other parameters, e.g., a CRC frame error indicator, and an error estimator (34) determines a level of corruption in the ADPCM data. The error mitigator (35) applies a predetermined set of replacement values based on the indicated level of corruption and the mitigated data is subsequently decoded in an ADPCM decoder (26).

30 Claims, 4 Drawing Sheets

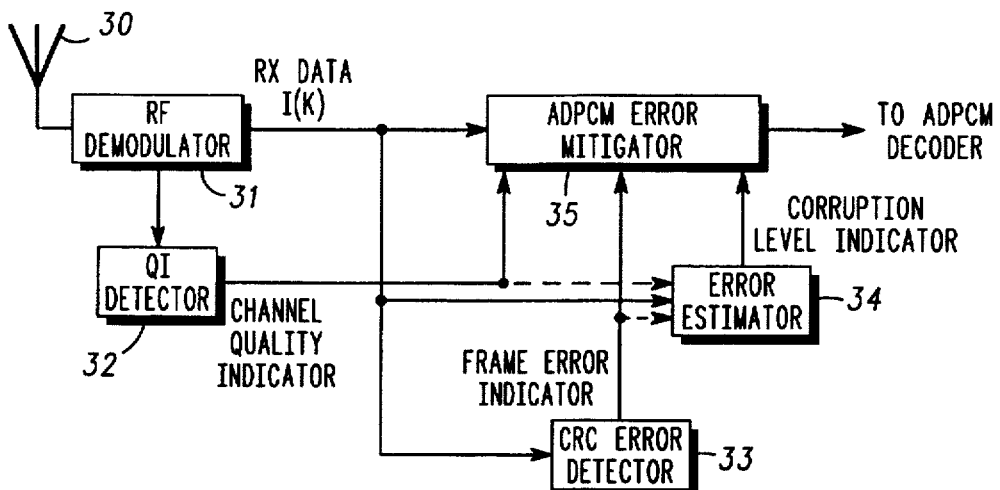
FIG. 3
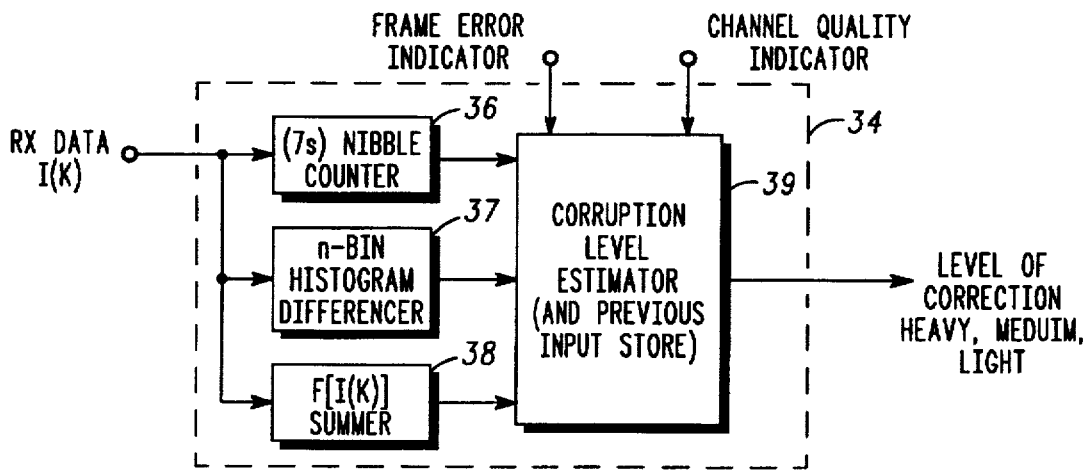
FIG. 4
FIG. 6
| | | TABLE F[X] | | | | | | |
|---|---|---|---|---|---|---|---|---|
| \|I(K)\| | 7 | 6 | 5 | 4 | 3 | 2 | 1 | 0 |
| F[I(K)] | 7 | 3 | 1 | 1 | 1 | 0 | 0 | 0 |
FIG. 7
DATA REPLACEMENT TABLES
| I(K) | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| HEAVY | 15 | 1 | 2 | 2 | 2 | 3 | 3 | 3 | 12 | 12 | 12 | 13 | 13 | 13 | 14 | 15 |
| MEDIUM | 15 | 3 | 3 | 3 | 3 | 3 | 3 | 3 | 12 | 12 | 12 | 12 | 12 | 12 | 12 | 15 |
| LIGHT | 15 | 1 | 2 | 3 | 3 | 4 | 5 | 3 | 12 | 10 | 11 | 12 | 12 | 13 | 14 | 15 |

METHOD AND APPARATUS FOR ERROR MITIGATING A RECEIVED COMMUNICATION SIGNAL

The present application is a continuation-in-part of U.S. application Ser. No. 08/308,185, filed Sep. 19, 1994, to Smith et al. U.S. Pat. No. 5,687,189.

FIELD OF THE INVENTION

The present invention relates generally to communications systems and more particularly to a system for error mitigation of a received communication signal.

BACKGROUND OF THE INVENTION

A key problem in all communication systems is how to minimize any degradation or error in a signal while in the communication channel. This problem is particularly significant in wireless communication systems, like cellular radio and PCS (person communication service) systems, where factors such as multipath fading, shadowing effects, other subscriber and environmental interference, and the like can contribute to the signal degradation. As a result, numerous solutions have been advanced to reduce the likelihood of error (e.g., improved modulation schemes) or to detect or correct the error (e.g., using CRC (cyclic redundancy check) or FEC (forward error correction) coding) at the receiver.

In order to minimize cost and system complexity many current (e.g., CT-2, the second generation cordless telephone) and proposed (e.g., some PCS) systems have adopted less error-tolerant approaches such as CCITT (International Telephone and Telegraph Consultative Committee) standard G.721 Adaptive Differential Pulse Code Modulation (ADPCM) speech coding. The ADPCM standard was originally designed to be robust against random bit error rates (BERs) up to $10^{-3}$, a reasonable rate for wireline transmissions. However, in wireless communications much higher BERs occur, necessitating additional error mitigation schemes. The most common approach to mitigating error has been to set all input bits to zero (which in ADCPM is a hexadecimal "F" or H15) in an indicated corrupted sequence. This approach mutes the entire signal for the duration of the sequence, thus typically improving audio output quality over a non-mitigated signal. However, this approach is limited by the error detection method employed, and often introduces further degradation due to the muting process. For example, when a CRC error indication is given for a frame, there is no distinction between minor (i.e., single bit or nibble) or more serious (i.e., burst) errors. Thus, an entire frame could end up being muted even though only one bit was in error. Moreover, because the ADPCM decoder's output is based on both the present and prior input samples, setting the input to zero will create transients in the ADPCM output for some time after the muting is removed. These transients may appear in the form of loud "clicks" or "pops" in the audio output, and these clicks or pops are sometimes more annoying than the unmitigated output would have been.

In order to further reduce the unwanted clicks or pops several post-decoding schemes have been proposed. For example, S. Kubota et al. in "Improved ADPCM Voice Transmission Employing Click Noise Detection Scheme for TDMA-TDD Systems," Fourth International Symposium on Personal Indoor and Mobile Radio Communications (PIMRC), Sep. 11, 1993, propose a system in which the decoded PCM (pulse code modulation) signal is measured for characteristics more indicative of click noise, like large signal level differences or dynamic range overflow. Upon detection of a click characteristic, the current burst is suppressed. In a related article by O. Nakamura et al., "Improved ADPCM Voice Transmission for TDMA-TDD Systems," Proceedings of the 43rd Vehicular Technology Conference, 1993, a similar system is proposed, except a buffer is also used to hold the last PCM frame/burst decoded without error. Upon detection of a click characteristic, the current burst is replaced by the buffered burst. While these articles report some improvement over simple muting each suffer disadvantages. The first system suffers from both problems of muting—a potentially annoying period of silence and subsequent transient noise. The second system requires replacement of an entire burst, leaving the ADPCM channel memory unaffected (i.e., the corrupted nibbles will continue to affect the ADPCM output after PCM click suppression has ceased) and is accomplished at the expense of increased post-decoding complexities and delay. Further, many systems physically separate the pre- and post-ADPCM decoding circuitry (such as some PCS systems in which the ADPCM and post-decoding stages are located at the radio port control unit (RPCU), physically separate from where the channel information is determined, at the radio port (RP)), and any requirement for channel information at the ADPCM stage would require an undesirable increase in information being communicated between the different circuit elements.

There remains therefore a need for an improved system for mitigating errors in received coded signals, while minimizing system complexity and cost and decoding delays.

BRIEF DESCRIPTION OF THE DRAWINGS

FIG. 3 is a block diagram illustrating an embodiment of a communications receiver in accordance with the invention.

FIG. 4 is a block diagram illustrating the error estimator of the receiver of FIG. 3;

FIG. 6 is a table illustrating a preferred F code table, relating ADPCM nibble values to ADPCM adaptive quantizer speed adjustments, that can be used with the bit error estimator of FIG. 4; and FIG. 7 is a table illustrating a preferred embodiment mitigation value table for use in accordance with the invention.

DETAILED DESCRIPTION OF AN EMBODIMENT

The need for an improved error mitigation approach, unsatisfied by the prior art, is met by an error mitigation system according to the present invention. Unlike the prior art, the present invention provides an approach for error mitigating word/nibble length signal portions based on signal quality and error indications, and includes adaptive features for responding to both bursty and more isolated errors. This novel error mitigation approach is processed substantially prior to signal decoding, and in many systems can be readily implemented utilizing error/quality measurements already available.

Figure 1:
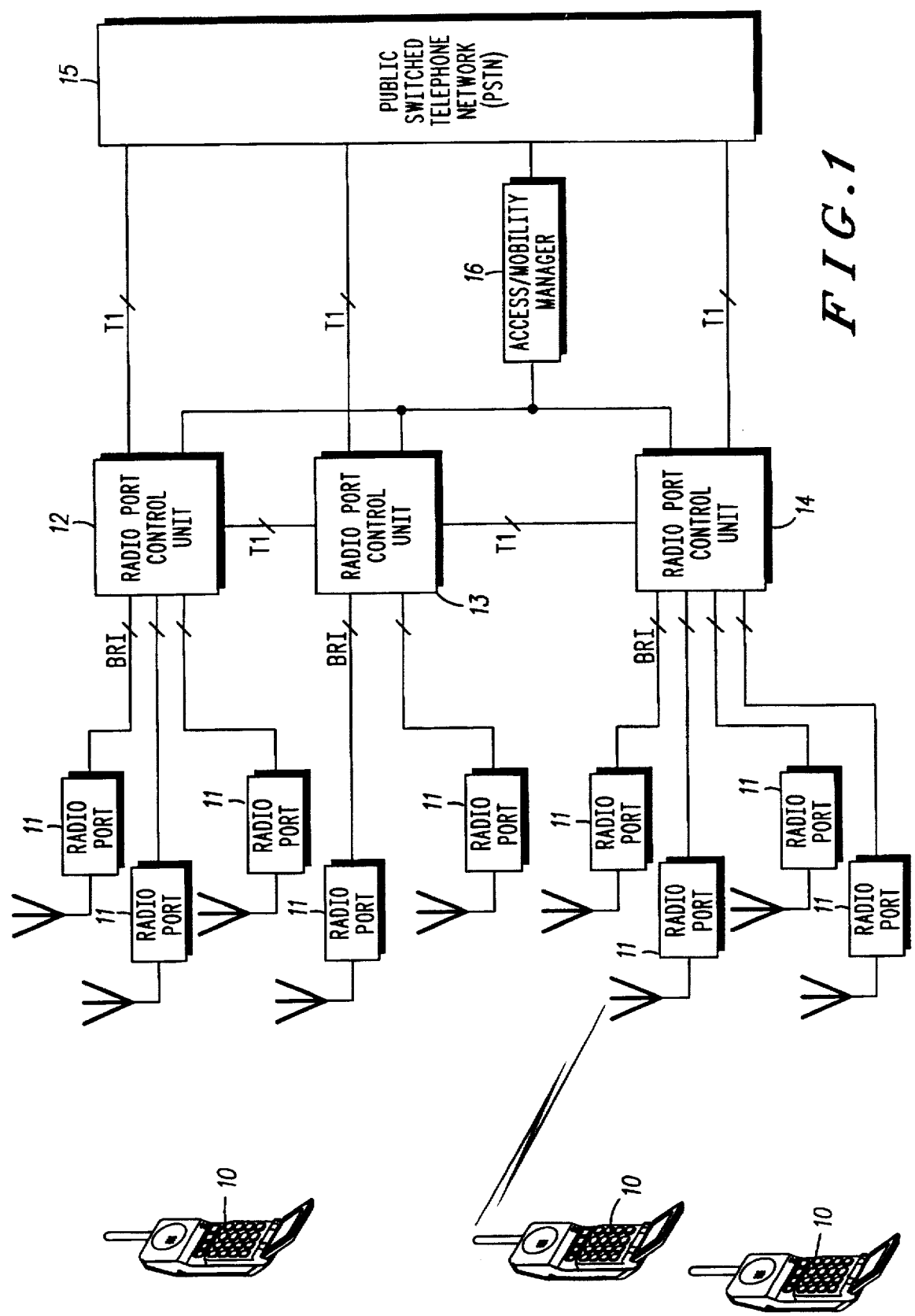
FIG. 1 generally depicts a communication system in which the present invention can be utilized.

FIG. 1 shows one such embodiment of a communication system in which the invention may be used. In this system, a plurality of subscriber units (radios here) 10 can be utilized to communicate in the system. The system 32 Kbit/s (kilobit/ second) ADPCM data transmissions occur between the radios 10 and any of a number of base stations or radio ports (RPs) 11. The RPs 11 are each connected to a base site control (BSC) or radio port control unit (RPCU), in this case 12, 13, and 14, which in turn, can communicate with a public switched telephone network (PSTN) 15. An access/mobility manager 16 (e.g., a mobile switching center (MSC)) is used to control each of the radio ports 12, 13, and 14, and the radio ports 12, 13, and 14 typically have T1 or similar high speed communication paths therebetween.

Figure 2:
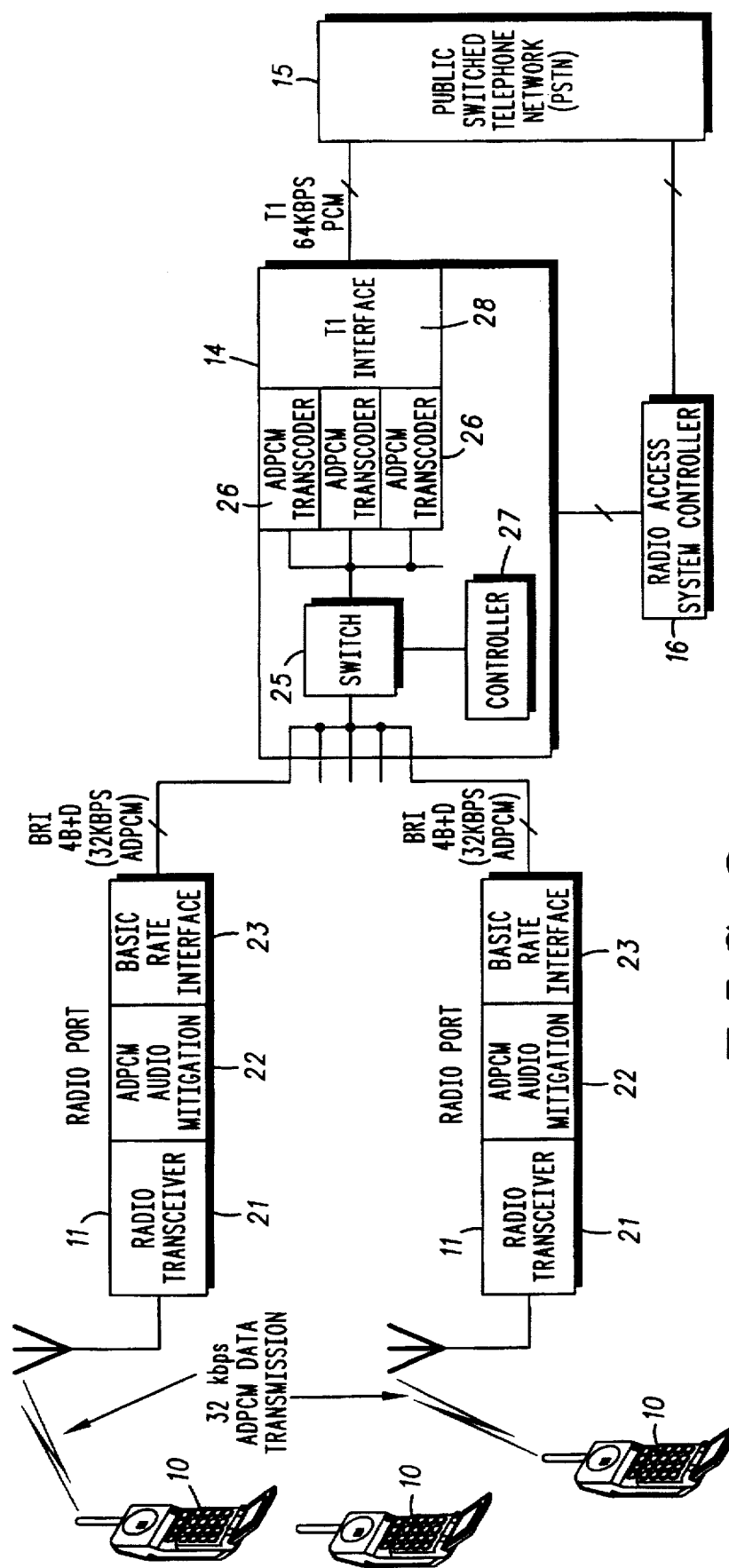
FIG. 2 illustrates a portion of the communication system of FIG. 1.
Figure 5:
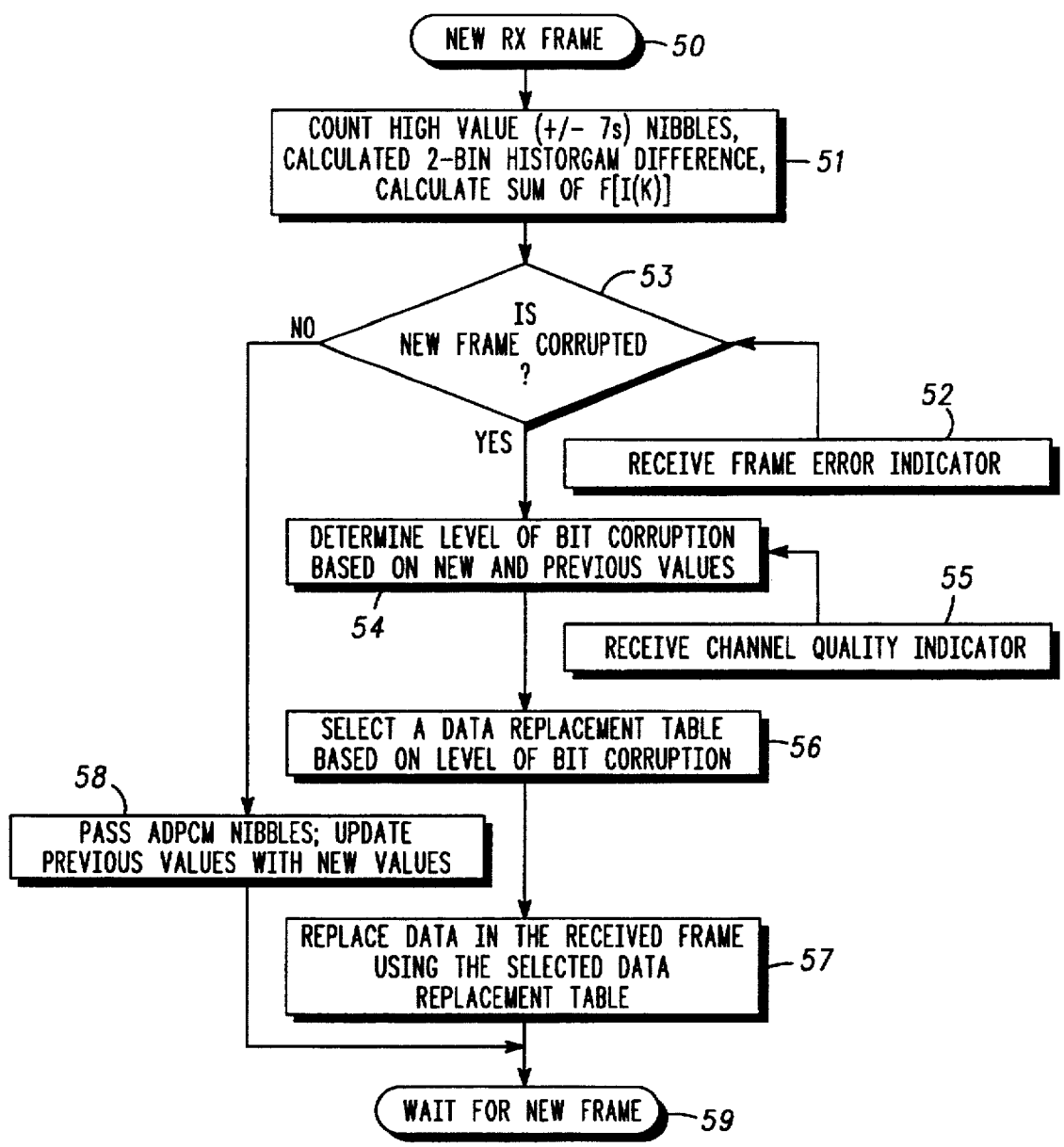
FIG. 5 is a flow chart illustrating the steps for error mitigating the signal being received by the receiver of FIG. 3.

Referring now to FIG. 2, a more detailed diagram shows two radio ports 11 connected to a typical radio port control unit, in this case 14, and the access/mobility manager 16 which can also be called a radio access system controller. The radio ports 11 both include radio transceivers 21, ADPCM Mitigator Units 22, and basic rate interfaces 23 (for ISDN (integrated services digital network) services). Within the radio port control unit 14, individual radio port lines can be switched via switch 25 (controlled by controller 27) to various ADPCM transcoders 26 and then interfaced to a T1 line via T1 interfaces 28 to the public switched telephone network 15. As illustrated, it is only necessary to transcode or, in this case, decode, ADPCM information that is being connected to the public switched telephone network, e.g. as 64 Kbit/s PCM for ISDN service. When the ADPCM information being received at one radio port 11 is to be transmitted to a radio 10 at another radio port 11, the ADPCM data can be transferred to another radio port 11 connected to the radio port control unit 14, or to one of the other radio port control units 12 and 13 of FIG. 1 via a T1 span line as ADPCM data. In such a scheme, it is necessary that the ADPCM audio mitigation or noise suppression preferably already be performed, since the information typically does not exist as PCM until it has been decoded in the radio port control unit prior to interface to the PSTN 15 and transfer of addition quality and/or CRC information adds to data overhead.

The basic block diagram of a radio port 11 receiver is illustrated in FIG. 3. It includes an antenna 30 that interfaces to a rf (radio frequency) demodulator 31. Demodulator 31 includes clock recovery and data formatting circuitry. The received data is also analyzed by a channel or signal quality indicator (QI) detector 32, which in its simplest form monitors for phase error or the presence of illegal data (such as a hex "0" nibble). In a first embodiment, particularly useful to cost-sensitive or less complex applications where additional error detection methods are undesirable (such as a number of CT-2 systems), the formatted ADPCM data is applied to the ADPCM mitigator circuit 35 (which alone forms the ADPCM mitigation unit 22 in this embodiment), which can be a simple digital circuit or, if desired, a processor performing the audio mitigation of this embodiment. If the signal quality indication from the QI detector 32 indicates noise or other degradation in signal quality, the ADPCM formatted data is modified in accordance with one of the preferred approaches below. When the signal quality is sufficient, the formatted ADPCM nibbles are merely passed through the ADPCM error mitigator 35 in this embodiment. In a second embodiment, the receiver includes additional signal quality measures via CRC (cyclic redundancy check) detector 33 and error estimator 34 (which together with error mitigator 35 form the mitigation unit 22 of FIG. 2), the operation of which is discussed more fully below.

In the preferred approach for the first embodiment, all non-zero predicted differential values are adjusted to a predetermined value. As previously noted, a hexadecimal value of "F" corresponds to a zero magnitude differential (the hexadecimal value "zero" being an illegal ADPCM encoded value); where hexadecimal values "1" through "7" represent positive differentials from the predicted values, then hexadecimal values "8" through "E" represent negative differentials from the predicted values. In this preferred case, all received hexadecimal values from "1" through "7" are replaced by hexadecimal "3" and the received hexadecimal values from "8" through "E" are replaced by hexadecimal "C," so that the received sequence, 0010 0001 1111 1110 (i.e., 21FE (hex)), would be modified to the series 0011 0011 1111 1100 (i.e., 33FC (hex)),. This substitution of nibbles has been found to yield substantially better output quality than prior art muting approaches.

In a second approach of the first embodiment, the same ADPCM data, 21FE, would be modified by reducing the magnitude by one for both the positive and negative values. This is accomplished by subtracting one from the positive hexadecimal values which are values hexadecimal "1" through hexadecimal "7", and by increasing by 1 the negative hexadecimal values which are hexadecimal "8" through hexadecimal "E." Where the hexadecimal "1" is present, which represents the smallest positive differential, the hexadecimal "1" is converted to the hexadecimal value which corresponds to a zero variation, which is hexadecimal "F". The resulting mitigated audio would be hexadecimal values 1FFF. This approach similarly provides significant noise burst reduction over the prior approach of zeroing (or converting to hexadecimal F) all corrupted data. By changing the magnitude of received ADPCM data either to a predetermined constant magnitude or a reduced magnitude compared to that of the received noisy signal, improved audio output quality is obtained. These approaches simplify system construction, system issues and costs, since the noise suppression can be applied directly to the ADPCM data.

The second embodiment has particular application to cellular and PCS systems (although it remains useful for all communications systems), where advantage can be taken of additional error detection approaches. One such PCS system in which the invention may be used is the proposed Personal Access Communication System (PACS)-based microcellular system. The PACS system is a time division multiple access (TDMA) system using π/4 DQPSK (differential quaternary phase shift keyed) modulation with ADPCM speech coding and a CRC-based error detection. In the differentially encoded π/4 DQPSK modulation scheme, information is transmitted in the phase transitions between successive symbols, with four valid phase transitions used to represent two bits per transmitted symbol. The demodulator of a PACS receiver removes π/4 radians from the differential phase stream, effectively mapping the π/4 DQPSK to DQPSK. After subtracting the π/4 radians from each transition, the valid constellation points in the signal space are 0, π/2, π and 3π/2 radians, representing the bit pairs 00, 01, 11 and 10. The demodulator extracts the absolute phase of the incoming signal and subtracts the phase value of successive symbols to determine the bit pair which was transmitted.

However, due to channel fading or interference, the received differential phase values of the incoming signal will not necessarily fall on one of the valid phase transitions/ constellation points. In order to assign a bit pair to each transition, the demodulator will pick the closest valid transition to the differential phase value received and map this transition to a bit pair. When the received phase transition differs from the transmitted phase transition by more than π/4, the demodulator will assign the wrong valid phase transition and a bit error will result. It should also be noted that some PACS systems use Gray coding of the bit pairs, so adjacent valid phase transitions represent bit pairs which differ in only one position.

It is also worth noting that the PACS TDMA system uses a 2.5 ms (millisecond) structure containing 8 time slots. Each time slot consists of 120 bits, 90 of which are protected by a (105,90) CRC code. Of these 90 bits, 80 bits (called bearer bits) are used to carry 20 4 bit ($a_3$–$a_0$) G.721 ADPCM nibbles representing 2.5 ms of speech. These nibbles are aligned such that the first bit of the 80 bearer bits is the MSB (most significant bit) of the first ADPCM nibble. Further, these nibbles are aligned such that the first two bits of an ADPCM nibble are represented by a single symbol. The G.721 standard calls for the use of 4 bit nibbles, which represent the prediction error in sign magnitude form. One nibble is encoded for each audio sample at a sampling rate of 8 kHz (kilohertz). The MSB of each nibble is a sign bit, with the remaining three bits used to represent the magnitude of the prediction error.

Returning to FIG. 3, in this second embodiment (using the PACS scheme for illustration) the received coded voice signal (which, e.g., in PACS is a π/4 DQPSK modulated adaptive differential pulse code modulated signal) is received via antenna 30. The signal is demodulated in demodulator 31 so as to output a demodulated coded voice signal (e.g., a demodulated ADPCM signal including frames each having 20 ADPCM nibbles, each nibble being a group of two 2-bit symbols). In addition to the demodulated ADPCM signal, the demodulator also has outputs to an error detector 33, QI detector 32, and error estimator 34. The error detector 33, preferably a CRC error detector, looks for an error indication in the check sum bits of the CRC coded frame, and outputs an error indication signal indicative of whether or not an error has been detected, e.g., in the 20 symbol/nibble frame. The quality indication detector 32 typically (in this second embodiment) determines a quality indication (QI) based on a monotonic function of channel quality. One such measure would be the inverse of the average distance of all the information bearing symbols of the frame/time slot to the closest constellation point (e.g., the position of the vector sum of all symbol values when all are adjusted so as to be proximate the 00 constellation point 300). This QI is compared to a predetermined threshold value, and a QI signal is outputted indicative of whether the average is greater than the threshold or not. An alternative measure of QI could be the carrier to interference and noise (C/I+N) ratio (a skilled artisan will appreciate that whether or not the inverse is used is for sake of convention, to permit consistency in referring to soft correction operations based on QI being less than a threshold; whether the operation is based on being less or greater than a threshold depends on the measure of QI used, and different measures, including those based on non-monotonic functions, from those described may be used for either QI).

The demodulated received ADPCM signal, a stream of 20 nibbles, is outputted to ADPCM error mitigator 35. The error mitigator 35 preferably operates to route the nibbles unaltered to the ADPCM decoder (e.g., transcorders 26 of FIG. 2) when no error is detected, e.g., in the absence of a CRC error indication signal (and alternatively, as in the first embodiment, the absence of an indication of an illegal nibble or phase transition). When an error is detected, error mitigator 35 will apply the type of mitigation determined by error estimator 34. Once an appropriate type/level of mitigation is applied, the error mitigated signal output of error mitigator 35 is forwarded for further processing by the ADPCM decoder into, e.g., a resultant PCM bit stream for communication via the PSTN 15.

The operation of the error estimator 34 and ADPCM error mitigator 35 can be better understood now by additional reference to FIGS. 4 through 7. Turning to FIG. 4, a preferred embodiment for error estimator 34 is illustrated. Error estimator 34 here includes a nibble counter 36, n-bin histogram differencer 37, and F table summer 38 each receiving data (nibbles I(k)) input from demodulator 31 (step 50), and having an output coupled to corruption level estimator 39. Corruption level estimator 39 also preferably has inputs coupled to CRC detector 34 and QI detector 32 for receiving error indicator (CRC) and channel quality indication (QI) information. In this embodiment the frame (CRC) error indication, and if used, the QI values are all derived from the same time slot. In practice, one time slot per frame would be used to provide this data, which means that the CRC and QI information is obtained (for PACS) every 2.5 ms. The main purpose of providing the CRC error indicator to error estimator 34 is to avoid the expenditure of processing/power when valid CRC error indicators are received. As described above, when the CRC is valid, all nibbles of the frame are passed unaltered by the ADPCM error mitigator 35 to the ADPCM decoder (step 58 of FIG. 5). The QI information is used as an additional input for determining the level of corruption of the ADPCM nibbles.

When the CRC detector 33 indicates an error in the frame, ADPCM error mitigator 35 applies one of several possible mitigation techniques, based upon a corruption level indicator (e.g., light, medium, heavy) from error estimator 34. In the error estimator 34, the nibble counter 36 receives each nibble of a current frame (step 50) and counts the number of high-value nibbles (e.g., the number of 7's and 8's (i.e., +/– 7's)) received. Because +/– 7's are the highest value, too many of these high values being received is an indication of signal corruption. Preferably, a predetermined threshold value representing a level beyond which corruption is likely, is used for comparison with the stored count. Alternatively, a series of thresholds, and other values (e.g., +/– 6's) may be used. At the end of each frame the count is outputted to corruption level estimator 39 (step 51). N-bin histogram unit 37 similarly receives the ADPCM nibbles, and stores in bins the count of plural categories of nibbles. In a simple, preferred approach, two bins are used to store the occurrences of absolute values 0–3 and 4–7. A difference is then taken between the number of values stored in both bins. This difference, when compared against a further predetermined threshold (again, either a set or adaptive value), also yields an indication of corruption. A skilled artisan will appreciate that modifications on both counter 36 and differencer 37 are possible, including having a 7 bin histogram so the occurrence of all values can be continuously monitored; however, there are trade-offs, and a full 7-bin histogram would require additional processing etc. to implement, and thus is less desirable in some applications like CT-2 and most PCS. The difference value is likewise forwarded to corruption level estimator 39 (step 51).

Summer 38 preferably functions by utilizing an ADPCM "F" table, which is related to the speed adjustments made to an ADPCM quantizer based on nibble value. One such table is illustrated in FIG. 6. Upon receipt of a nibble, summer 38 looks up the corresponding F code from the F table, and sums all codes in the 20 nibble frame. This sum is also forwarded to corruption level estimator 39 (step 51), both for use as an indication of corruption and in determining the level of corruption.

Upon receipt of the high nibble count, difference value, and F code sum, and preferably upon receipt of a frame error (failed CRC) indicator (steps 52, 53) and channel QI (step 54), corruption level estimator 39 determines an appropriate one of plural corruption levels most likely indicated (step 55), and provides a corruption level indicator to the ADPCM error mitigator 35. The corruption level indicator is preferably determined based on all five inputs, but a combination of these or even additional factors may also be considered, depending on specific design factors.

In order to optimize mitigation without requiring too much additional processing, the presently preferred embodiment for determining the corruption level indicator includes employing the following specific rules to the above 5 input values. First, a check is performed concerning the duration of an indicated corrupt signal. The corruption level estimator operates to store several previous input values, and in this case operates to store the CRC frame error indicators. Thus, if a corrupt frame threshold is exceeded (e.g., 6 of the previous 10 frames having a failed CRC checksum), the corruption level indicator is automatically set to high.

Second, the signal QI is preferably checked. If the QI value for the current frame indicates signal reception of high quality for the corrupted frame, this is a good indication of light corruption so a light corruption level indicator is output.

Third, an analysis of the current n-bin histogram is performed. For a 2-bin histogram with bins for absolute values 0–3 and 4–7, the number of nibbles per bin per frame are differenced, with the difference value being compared against several thresholds.

For example, for four thresholds of 0, 2, 6 and 10, the following presently preferred process can be employed. First, if the difference of the 4–7 bin from the 0–3 bin equals or exceeds the light threshold value of 10, this is indicative of light corruption and a light corruption level indicator is output. Second, if the difference is less than the heavy threshold value of 0, this is indicative of heavy corruption and a heavy corruption level indicator is output.

Next, if the difference is equal or greater to a first medium threshold of 6 and less than the light threshold of 10, the F code sum parameter (i.e., the sum of all F codes for the current frame via F code summer 38) is preferably compared against the maximum F code sum for the previous 6 uncorrupted frames (these sums being similarly stored in corruption level estimator 39). A high nibble count (i.e., the count of the number of '+/−7' nibbles in the current frame from nibble counter 36) is also preferably utilized. Based on these parameters, a corruption level indicator is preferably decided as follows: A heavy corruption level indicator is selected if: (1) the F code sum is equal to or exceeds 30, or (2) the F code sum exceeds 19 and is less than 30, and the sum exceeds the maximum F code sum for the previous frames by a value of 5 or more. A light corruption level indicator is selected if: (1) the F code sum is equal to or less than 10; or (2) the F code sum exceeds 10 and is less than 20 and (i) the difference of the maximum F code sum of the previous frames and the F code sum is greater than or equal to 5, or (ii) the number of '+/−7' nibbles in the corrupted frame exceeds 1. A medium corruption level indicator is selected if: (1) the F code sum equals or exceeds 30; (2) the F code sum exceeds 19 and is less than 30, and the sum does not exceed the maximum F code sum for the previous frames by a value of 5 or more; and (3) the F code sum exceeds 10 and is less than 20 and (i) the difference of the maximum F code sum of the previous frames and the F code sum is less than 5, or (ii) the number of '+/−7' nibbles in the corrupted frame equals or is less than 1.

Next, if the difference is equal or greater to a second medium threshold of 2 and less than the first medium threshold of 6, the corruption level indicator is preferably decided as follows: A heavy corruption level indicator is selected if: (1) the F code sum is equal to or exceeds 30, or (2) the F code sum exceeds 19 and is less than 30, and the sum exceeds the maximum F code sum for the previous frames by a value of 5 or more. A light corruption level indicator is selected if: (1) the F code sum is less than 20 and the number of '+/−7' nibbles in the corrupted frame exceeds 1. Otherwise, a medium corruption level indicator is selected.

Finally, if the difference is equal or greater to the heavy threshold of 0 and less than the second medium threshold of 2, the corruption level indicator is preferably decided as follows: A heavy corruption level indicator is selected if: (1) the F code sum is equal to or exceeds 30, (2) the F code sum exceeds 19 and is less than 30, and the sum exceeds the maximum F code sum for the previous frames by a value of 5 or more; or (3) the F code sum is less than 20 and the sum is greater than the maximum F code sum for the previous frames. Otherwise, a medium corruption level indicator is selected.

It should be appreciated that the above example is illustrative only of a presently preferred embodiment for PACS type formatting, i.e., for a 2.5 msec (millisecond) frame with 20 nibbles per frame, etc. For larger frames or different design parameters, it is likely that the number and values for the thresholds, etc. will change; however, one of ordinary skill in the art will readily appreciate how to adjust such based on the chosen system design. Further, while the circuitry of the embodiment of FIGS. 3 and 4 has been logically separated, a skilled artisan will appreciate that the actual implementation of these functions may be accomplished in a variety of different manners including, but not limited to, properly programming a digital signal processor (DSP), coupling discrete components together, and using a combination of one or more application specific integrated circuits (ASICs). It should thus be understood that the description of these embodiments is intended for illustration and not a limitation on the scope of the invention.

Once error mitigator 35 receives the corruption level indicator, it selects and applies one of plural predetermined levels of mitigation, e.g., sets of nibble replacement values, to the received ADPCM nibbles (step 50) based on an appropriate set of values for the indicated corruption level (steps 56, 57). One such table of replacement values is illustrated in the table of FIG. 7. In other words, where the data value I(k) differs from the look-up value, it is replaced by the look-up value from the table for the appropriate mitigation level. One will recognize that the medium corruption level replacement values are the same as those used in connection with the first approach of the first embodiment above, i.e., replacing the non-zero values with +/− 3 values. Rather than replace all values, too, only that predetermined category of ADPCM symbols needing replacement may be substituted using a set of predetermined values, or otherwise operated on, e.g., as in the first embodiment, reducing values of certain nibbles by 1. The error mitigated ADPCM nibbles are then forwarded for decoding, and the process repeated for the next frame (step 59).

Thus, this second embodiment permits an improved mitigation without the need for frame muting or post-decoding circuitry. To the extent "muting" is done by the error mitigator 35, it is done on a nibble by nibble replacement basis, thus avoiding the sizable transients resulting from a frame mute. It is also adaptive, allowing for various levels/ types of "muting" or replacement to be performed, based on the level of corruption, and readily adaptable to a variety of different systems and available parameters. As a result, an improved signal with minimal additional cost in circuitry or processing is achieved.

While the above embodiments illustrate two preferred implementations for error mitigation in a wireless communications system, it should be understood that the invention also has application to any other type of communication system in which error mitigation is useful. Thus, while it has particular application to PCS and CT-2 systems using ADPCM coding (including both subscriber units and infrastructure base stations and controllers), it may be used in any number of systems, including those that use a different form of coding and those that communicate over wireline (e.g., twisted pair, coaxial cable, and fiber optic), and it will be apparent to one skilled in the art that various modifications and changes can be made without departing from the spirit and the scope of the invention. Therefore, the scope of the invention should be understood in view of the claims below.

We claim:

1. A method for improving quality of a received coded voice signal comprising:
   (a) determining an error indication of whether error is present in the signal;
   (b) determining from the signal a corruption level indicator; and
   (c) error mitigating the signal, when the error indication is indicative of error in the signal, by one of plural predetermined levels of mitigation based on the corruption level indicator.

2. The method of claim 1, wherein step (a) comprises determining if a cyclic redundancy check (CRC) error is detected.

3. The method of claim 1, wherein the signal is an adaptive differential pulse code modulation (ADPCM) coded signal, and step (b) comprises: determining a quality indication (QI) of the signal, comparing the QI against a predetermined quality threshold, and when the QI exceeds the predetermined quality threshold selecting a light corruption level indicator.

4. The method of claim 1, wherein the signal is an adaptive differential pulse code modulation (ADPCM) coded signal, and step (a) comprises determining if error is detected for each frame of the signal and when error is detected generating an error indicator.

5. The method of claim 4, wherein step (a) comprises generating an error indicator when the error indication is indicative of error in the signal, step (b) comprises monitoring a number of times the error indicator is generated in a predetermined number of frames, and when the number of times exceeds a predetermined corrupt frame threshold selecting a heavy corruption level indicator.

6. The method of claim 4, wherein step (b) comprises summing a first group of ADPCM nibbles each being less than or equal to a predetermined value to form a first sum and a second group of ADPCM nibbles each being greater than the predetermined value to form a second sum, subtracting the first sum from the second sum to form a first difference, and comparing the first difference with a predetermined corruption level threshold to determine the corruption level indicator.

7. The method of claim 6, further comprising selecting a light corruption level indicator when the first difference is less than a predetermined light corruption level threshold.

8. The method of claim 6, further comprising selecting a heavy corruption level indicator when the first difference is greater than a predetermined heavy corruption level threshold.

9. The method of claim 6, further comprising, when the first difference is greater than a predetermined light corruption level threshold and less than a predetermined heavy corruption level threshold, determining the corruption level indicator based on a sum of parameter values corresponding to the ADPCM nibbles.

10. The method of claim 9, wherein the parameter values are ADPCM F codes corresponding to the ADPCM nibbles, step (b) further comprising determining the corruption level indicator based on a comparison of the sum of parameter values with plural F code sum thresholds.

11. The method of claim 10, further comprising counting a number of nibbles exceeding a first nibble value threshold, and additionally determining the corruption level indicator based on a comparison of the number of nibbles with a first nibble count threshold.

12. The method of claim 1, wherein the signal is an adaptive differential pulse code modulation (ADPCM) coded signal, the corruption level indicator is a medium corruption level indicator, and step (c) comprises error mitigating the signal by a medium level of mitigation comprising replacing each of a predetermined class of ADPCM nibbles with one of a set of predetermined magnitude values.

13. The method of claim 12, further comprising replacing each of a first predetermined class of ADPCM nibbles comprising all nibbles having hexadecimal values between 0 and 8 with a hexadecimal value 3, and replacing each of a second predetermined class of ADPCM nibbles comprising all nibbles having hexadecimal values between 7 and F with a hexadecimal value C.

14. A method for improving quality of a received differential pulse code modulated (PCM) signal comprising:
   (a) determining an error indication of whether error is present in the signal;
   (b) error mitigating the signal, when the error indication is indicative of error in the signal, by replacing each differential PCM symbol of a predetermined category of differential PCM symbols with one of a set of predetermined values having a magnitude greater than zero.

15. The method of claim 14, wherein the differential PCM signal is an adaptive differential PCM (ADPCM) signal and each differential PCM symbol is an ADPCM nibble, step (a) comprises determining an error indication of whether an error is present in a frame of the signal, and step (b) comprises replacing each nibble of the frame having a hexadecimal value between 0 and 8 with a hexadecimal value 3, and replacing each nibble of the frame having a hexadecimal value between 7 and F with a hexadecimal value C.

16. The method of claim 14, wherein the differential PCM signal is an adaptive differential PCM (ADPCM) signal and each differential PCM symbol is an ADPCM nibble, step (a) comprises determining an error indication of whether an error is present in a frame of the signal, and step (b) comprises decreasing each nibble of the frame having a hexadecimal value between 0 and 8 by a corresponding predetermined hexadecimal value, and increasing each nibble of the frame having a hexadecimal value between 7 and F by the corresponding predetermined hexadecimal value.

17. The method of claim 16, wherein step (b) comprises decreasing each nibble of the frame having a hexadecimal value of 1, 2, 3, 4, 5, 6 or 7 by a value 1, and increasing each nibble of the frame having a hexadecimal value of 8, 9, A, B, C, D or E by the value 1.

18. The method of claim 14, wherein the differential PCM signal is an adaptive differential PCM (ADPCM) signal and each differential PCM symbol is an ADPCM nibble, step (a) comprises determining an error indication of whether an error is present in a frame of the signal, and step (b) comprises decreasing each nibble of the frame having a hexadecimal value of 3, 4, 5, 6 or 7, respectively to a mitigated value of 2, 2, 3, 3 and 3, respectively, and increasing each nibble of the frame having a hexadecimal value of 8, 9, A, B or C, respectively, to a mitigated value of C, C, C, D and D, respectively.

19. The method of claim 14, wherein the differential PCM signal is an adaptive differential PCM (ADPCM) signal and each differential PCM symbol is an ADPCM nibble, step (a) comprises determining an error indication of whether an error is present in a frame of the signal, and step (b) comprises decreasing each nibble of the frame having a hexadecimal value of 4, 5, 6 or 7, respectively to a mitigated value of 3, 4, 5 and 3, respectively, and increasing each nibble of the frame having a hexadecimal value of 8, 9, A or B, respectively, to a mitigated value of C, B, A, and C, respectively.

20. A method for improving quality of a received adaptive differential pulse code modulated (ADPCM) signal comprising:
   (a) determining an error indication of whether error is present in the signal;
   (b) determining from the signal a corruption level indicator; and
   (c) error mitigating the signal, when the error indication is indicative of error in the signal, by a first level of mitigation based on the corruption level indicator.

21. The method of claim 20, wherein step (a) comprises determining if error is detected for each frame of the signal and when error is detected generating an error indicator, and step (b) comprises monitoring a number of times an error indicator is generated in a predetermined number of frames, and when the number of times exceeds a predetermined corrupt frame threshold selecting a heavy corruption level indicator.

22. The method of claim 20, wherein step (a) comprises determining if error is detected for each frame of the signal and when error is detected generating an error indicator, and step (b) comprises summing at least a first group of ADPCM nibbles and a second group of ADPCM nibbles to form a histogram of the at least first and second groups, and determining the corruption level indicator from the histogram.

23. The method of claim 20, wherein step (a) comprises determining if error is detected for each frame of the signal and when error is detected generating an error indicator, and step (c) further comprises error mitigating the signal by replacing each nibble of the frame having a hexadecimal value between 0 and 8 with a hexadecimal value 3, and replacing each nibble of the frame having a hexadecimal value between 7 and F with a hexadecimal value C.

24. A communication unit adapted for improving a quality of a received adaptive differential pulse code modulated (ADPCM) signal comprising:
   (a) an error detector operable for receiving the signal and determining an error indication of whether error is present in the signal;
   (b) an error mitigator coupled to the error detector operable for receiving the signal and determining from the signal a corruption level indicator and error mitigating the signal, when the error indication is indicative of error in the signal, by a first level of mitigation based on the corruption level indicator and outputting an error mitigated signal; and
   (c) an ADPCM decoder coupled to the error detector operable for decoding the error mitigated signal.

25. The communication unit of claim 24, wherein the error mitigator comprises a mitigation unit, and an error estimator coupled to the error detector and the mitigation unit, the error estimator being operable for determining from the signal the corruption level indicator, and the mitigation unit being operable for error mitigating the signal, when the error indication is indicative of error in the signal, by the first level of mitigation based on the corruption level indicator and outputting the error mitigated signal.

26. The communication unit of claim 25, further comprising a channel quality indicator detector coupled to the error estimator.

27. The communication unit of claim 25, wherein the error estimator comprises a histogram unit and a corruption level estimator coupled to the histogram unit.

28. The communication unit of claim 24, wherein the error detector is further operable for determining if error is detected for each frame of the signal and when error is detected generating an error indicator, and the error mitigator is further operable for error mitigating the signal by replacing each nibble of the frame having a hexadecimal value between 0 and 8 with a hexadecimal value 3, and replacing each nibble of the frame having a hexadecimal value between 7 and F with a hexadecimal value C.

29. The communication unit of claim 24, further comprising a demodulator coupled to the error detector and the error mitigator, wherein the communication unit is a wireless subscriber unit.

30. The communication unit of claim 24, further comprising a demodulator coupled to the error detector and the error mitigator, wherein the communication unit is a base station and controller.

* * * * *